United States Patent
Morinaga (10) Patent No.: US 7,769,898 B2
(45) Date of Patent: Aug. 3, 2010

(54) MOBILE COMMUNICATION TERMINAL AND WEBSITE BROWSING METHOD

(75) Inventor: Yasuo Morinaga, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 346 days.

(21) Appl. No.: 12/034,553

(22) Filed: Feb. 20, 2008

(65) Prior Publication Data

US 2008/0201489 A1 Aug. 21, 2008

(30) Foreign Application Priority Data

Feb. 20, 2007 (JP) ............................. 2007-039455

(51) Int. Cl.
  G06F 15/16 (2006.01)
  G06F 15/173 (2006.01)
  G06F 15/177 (2006.01)
  H04L 12/28 (2006.01)

(52) U.S. Cl. ..................... 709/246; 709/227; 719/311

(58) Field of Classification Search ................ 709/246, 709/217–228; 455/461; 370/395.23, 913; 719/311
See application file for complete search history.

(56) References Cited

U.S. PATENT DOCUMENTS

| | | | | |
|---|---|---|---|---|
| 7,457,634 B2* | 11/2008 | Morinaga et al. | ......... | 455/550.1 |
| 7,483,690 B2* | 1/2009 | Muramatsu et al. | ......... | 455/410 |
| 2002/0013831 A1* | 1/2002 | Astala et al. | ................ | 709/220 |
| 2002/0046353 A1* | 4/2002 | Kishimoto | ................ | 713/202 |
| 2004/0043766 A1* | 3/2004 | Sashihara | ................ | 455/432.1 |
| 2005/0003854 A1 | 1/2005 | Sharma et al. | | |
| 2005/0033693 A1* | 2/2005 | Toiminen | ..................... | 705/43 |
| 2005/0070280 A1 | 3/2005 | Jung et al. | | |
| 2005/0097356 A1* | 5/2005 | Zilliacus et al. | ............. | 713/201 |
| 2005/0113655 A1* | 5/2005 | Hull | ............................ | 600/323 |
| 2005/0147069 A1* | 7/2005 | Rink et al. | .................. | 370/338 |
| 2005/0148342 A1* | 7/2005 | Sylvain | ................... | 455/456.3 |
| 2005/0170851 A1* | 8/2005 | Melpignano et al. | ...... | 455/456.5 |
| 2005/0249171 A1 | 11/2005 | Buckley et al. | | |
| 2005/0282573 A1* | 12/2005 | Maeno | ........................ | 455/522 |
| 2005/0287998 A1* | 12/2005 | Tonouchi | .................... | 455/416 |
| 2006/0014561 A1* | 1/2006 | Morinaga et al. | ......... | 455/553.1 |
| 2006/0173844 A1* | 8/2006 | Zhang et al. | .................. | 707/9 |

(Continued)

FOREIGN PATENT DOCUMENTS

JP 2004-265123 9/2004

(Continued)

*Primary Examiner*—Haresh N Patel
(74) *Attorney, Agent, or Firm*—Oblon, Spivak, McClelland, Maier & Neustadt, L.L.P.

(57) ABSTRACT

An object is to implement automatic selection of an optimal combination of a communication network with a web browser according to a connection environment, thereby improving user's convenience during browsing a website. A cell phone achieving this object is composed of a first browser for browsing web data described in cHTML; a second browser for browsing web data described in HTML; a radio information collector for acquiring radio intensity information about a base station device and an access point; a communication network selector for selecting a communication network, based on the radio intensity information; a data transmitter-receiver for receiving web data from a WWW server via the selected communication network; a browser selector for determining a description language of the web data and thereby selecting either of the first browser and the second browser; and a data output controller for outputting the web data to the selected browser.

4 Claims, 6 Drawing Sheets

U.S. PATENT DOCUMENTS

| | | | |
|---|---|---|---|
| 2006/0179475 A1* | 8/2006 | Zhang et al. | 726/3 |
| 2006/0200541 A1* | 9/2006 | Wikman et al. | 709/223 |
| 2006/0264201 A1* | 11/2006 | Zhang | 455/411 |
| 2007/0107019 A1* | 5/2007 | Romano et al. | 725/80 |
| 2007/0121536 A1* | 5/2007 | Aihara | 370/318 |
| 2008/0159244 A1* | 7/2008 | Hunziker | 370/338 |
| 2009/0282238 A1* | 11/2009 | Bichot et al. | 713/155 |

FOREIGN PATENT DOCUMENTS

| | | |
|---|---|---|
| JP | 2006-074295 | 3/2006 |
| JP | 2006-262508 | 9/2006 |
| JP | 2006-350831 | 12/2006 |

\* cited by examiner

| CONTROL NUMBER | VISIT | LINE TYPE | RADIO INTENSITY (dBm) | LOCATION INFORMATION |
|---|---|---|---|---|
| ⋮ | ⋮ | ⋮ | ⋮ | ⋮ |
| 1 | Y | MN | -50 | BS01 |
| 2 | Y | WLAN | -50 | 1F-A |
| 3 | N | WLAN | -70 | 1F-B |
| 4 | N | WLAN | -70 | 1F-B |
| 5 | N | WLAN | -70 | 1F-B |
| ⋮ | ⋮ | ⋮ | ⋮ | ⋮ |

*Fig.4*

```
====================================================
HTTP/1.1 200 OK
Date: Wed, 05 Sep 2001 06:06:19 GMT
~~~~~~~~~~~~~~~~~~
P3P: policyref="/w3c/p3p.xml",CP="NOI DSP COR ADM DEV OUR STP"
Last-Modified: Wed, 05 Sep 2001 06:02:09 GMT
Content-Type: text/html; charset=shift_jis
Content-length :70
Content-Language: ja
====================================================
```

MOBILE COMMUNICATION TERMINAL AND WEBSITE BROWSING METHOD

BACKGROUND OF THE INVENTION

1. Field of the Invention

The present invention relates to a mobile communication terminal and a website browsing method.

2. Related Background of the Invention

Websites are recently actively being browsed using mobile communication terminals such as cell phones. Such websites include sites that distribute data described in a markup language (description format) such as cHTML (Compact HyperText Markup Language) being a simplified language for cell phones, sites that distribute both of data described in HTML (HyperText Markup Language) or the like for personal computers and data described in cHTML, and so on. It is common practice for cell phone users to designate an address of a site for cell phones to browse a website. On the other hand, some types of cell phones are equipped with a full browser function to permit access to data described in HTML. Use of the cell phones of this type permits the users to access sites for personal computers as well. A technique for adapting for types of websites is a communication device for storing and sharing a URL between web browsers when accepting a user's switch instruction between the web browsers, as described in Patent Document 1 below.

The recent diversification of communication networks has made a single cell phone connectible not only to mobile communication networks but also to wireless LAN networks. This diversification of connection forms permits the users to enjoy both of an advantage of capability of ensuring continuity of communication through the use of the mobile communication network during movement in a wide range, and an advantage of capability of increasing a communication rate in transmission of large-volume data through the use of the wireless LAN network. A control device described in Patent Document 2 below is a technique developed with focus on this diversification of connection forms. This control device automatically changes a configuration of a web browser according to a form of a network currently connected.

Patent Document 1: Japanese Patent Application Laid-open No. 2006-350831

Patent Document 2: Japanese Patent Application Laid-open No. 2004-265123

SUMMARY OF THE INVENTION

With the conventional apparatus described above, however, the user himself or herself had to determine which web browser should be used, according to a website to be accessed, to select a communication network for stable reception of data, and to implement a connection thereto. This resulted in increasing the time and effort for reconnection to a communication network during movement and for switching between web browsers, and considerably degrading the user's convenience.

Therefore, the present invention has been accomplished in view of the above-described problem and an object of the invention is to provide a mobile communication terminal and a website browsing method adapted to automatically select an optimal combination of a communication network with a web browser according to a connection environment, thereby improving the user's convenience during browsing a website.

In order to solve the above problem, a mobile communication terminal according to the present invention is a mobile communication terminal for browsing web data from a predesignated communication site through a communication network selected out of a mobile communication network and a wireless LAN network, the mobile communication terminal comprising: first browsing means for browsing web data described in a first data format; second browsing means for browsing web data described in a second data format; radio information collecting means for receiving radio waves from a base station device belonging to the mobile communication network and from an access point device belonging to the wireless LAN network, and thereby acquiring radio intensity information about the mobile communication network and the wireless LAN network; communication network selecting means for selecting a communication network to be connected, out of the mobile communication network and the wireless LAN network, based on the radio intensity information acquired by the radio information collecting means; data information receiving means for receiving information about a data format of web data as a browsing object from the communication site; browser selecting means for determining which of the first and second data formats is the data format received by the data information receiving means, and thereby selecting either of the first browsing means and the second browsing means; and data outputting means for receiving the web data from the communication site via the communication network selected by the communication network selecting means and for outputting the web data to the browsing means selected by the browser selecting means.

A website browsing method according to another aspect of the present invention is a website browsing method for browsing web data from a predesignated communication site through a communication network selected out of a mobile communication network and a wireless LAN network, the website browsing method comprising: a first browsing step wherein first browsing means browses web data described in a first data format; a second browsing step wherein second browsing means browses web data described in a second data format; a radio information collecting step wherein radio information collecting means receives radio waves from a base station device belonging to the mobile communication network and from an access point device belonging to the wireless LAN network, and thereby acquires radio intensity information about the mobile communication network and the wireless LAN network; a communication network selecting step wherein communication network selecting means selects a communication network to be connected, out of the mobile communication network and the wireless LAN network, based on the radio intensity information acquired in the radio information collecting step; a data information receiving step wherein data information receiving means receives information about a data format of web data as a browsing object from the communication site; a browser selecting step wherein browser selecting means determines which of the first and second data formats is the data format received in the data information receiving step, and thereby selects either of the first browsing means and the second browsing means; and a data outputting step wherein data outputting means receives the web data from the communication site through the communication network selected in the communication network selecting step and outputs the web data to the browsing means selected in the browser selecting step.

According to the mobile communication terminal and the website browsing method, the radio intensity information about the mobile communication network and the wireless LAN network is acquired from the base station device and from the access point device and the communication network to be connected is selected based on the radio intensity information. Furthermore, the information about the data format of the web data as a browsing object is received from the communication site and the browsing means capable of browsing the web data in the data format is selected. This configuration permits the optimal combination of the browsing means with the communication network to be automatically selected according to a current network environment and a type of a website as a browsing object, and thus improves the user's convenience during browsing the website.

Preferably, the data information receiving means further receives information about a data size of the web data, and, based on the information about the data size, the communication network selecting means selects the wireless LAN network if the data size is not less than a predetermined threshold, and the communication network selecting means selects the mobile communication network if the data size is less than the predetermined threshold. In this case, the communication network is selected as one suitable for the data size of the web data as a browsing object, whereby smooth browsing of the website is implemented while minimizing the load on the communication network.

Furthermore, also preferably, the data information receiving means further receives information about a data type of the web data, and, based on the information about the data type, the communication network selecting means further selects the communication network out of the mobile communication network and the wireless LAN network. In this case, for example, in receiving large-volume data such as image data or voice data, the communication network is selected according to the data, whereby smooth browsing of the website is implemented while minimizing the load on the communication network.

DESCRIPTION OF THE PREFERRED EMBODIMENTS

The preferred embodiments of the mobile communication terminal according to the present invention will be described below in detail with reference to the drawings. The same elements will be denoted by the same reference symbols in the description of the drawings, without redundant description.

Figure 1:
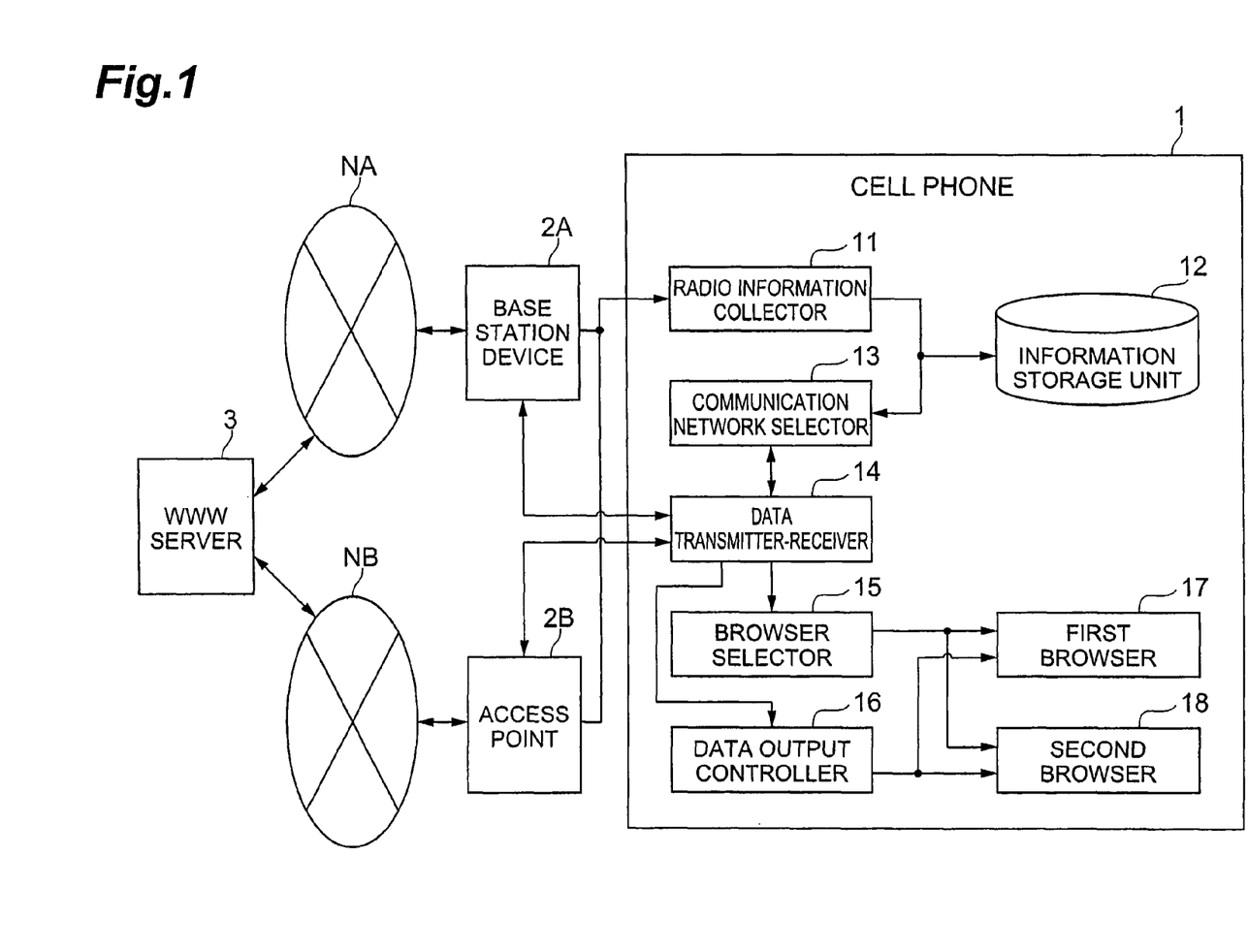
FIG. 1 is a schematic configuration diagram of a cell phone as a preferred embodiment of the mobile communication terminal according to the present invention.

FIG. 1 is a schematic configuration diagram of a cell phone 1 being a preferred embodiment of the mobile communication terminal according to the present invention. The cell phone 1 shown in the same drawing is a communication terminal that is able to transmit and receive data to and from a mobile communication network NA adopting a mobile communication system such as IMT2000 (International Mobile Telecommunications 2000) or PDC (Personal Digital Cellular), through a base station device 2A and that is able to transmit and receive data to and from a wireless LAN network NB adopting a wireless LAN communication system typified by IEEE802.11b/a/g, through an access point 2B. Here the base station device 2A is a facility for network access belonging to the mobile communication network NA and the access point 2B is a facility for network access belonging to the wireless LAN network NB. The cell phone 1 is equipped with a first browser (first browsing means) 17 as a normal browser being a software application for receiving and browsing web data described in cHTML, from a website for cell phones, and with a second browser (second full browsing means) 18 as a full browser being a software application for receiving and browsing web data described in HTML, from a website for personal computers. The first browser 17 and the second browser 18 are configured to acquire web data from a WWW server 3 connected to the mobile communication network NA and to the wireless LAN network NB and to display the web data in a browsable state. For convenience' sake, there are only one access point 2B and one base station device 2A illustrated, but there may be two or more access points and base stations.

The configuration of the cell phone 1 will be described below. As shown in FIG. 1, the cell phone 1 is functionally composed of a radio information collector (radio information collecting means) 11, an information storage unit 12, a communication network selector (communication network selecting means) 13, a data transmitter-receiver (data information receiving means and data outputting means) 14, a browser selector (browser selecting means) 15, a data output controller (data outputting means) 16, the first browser 17, and the second browser 18.

Figure 2:
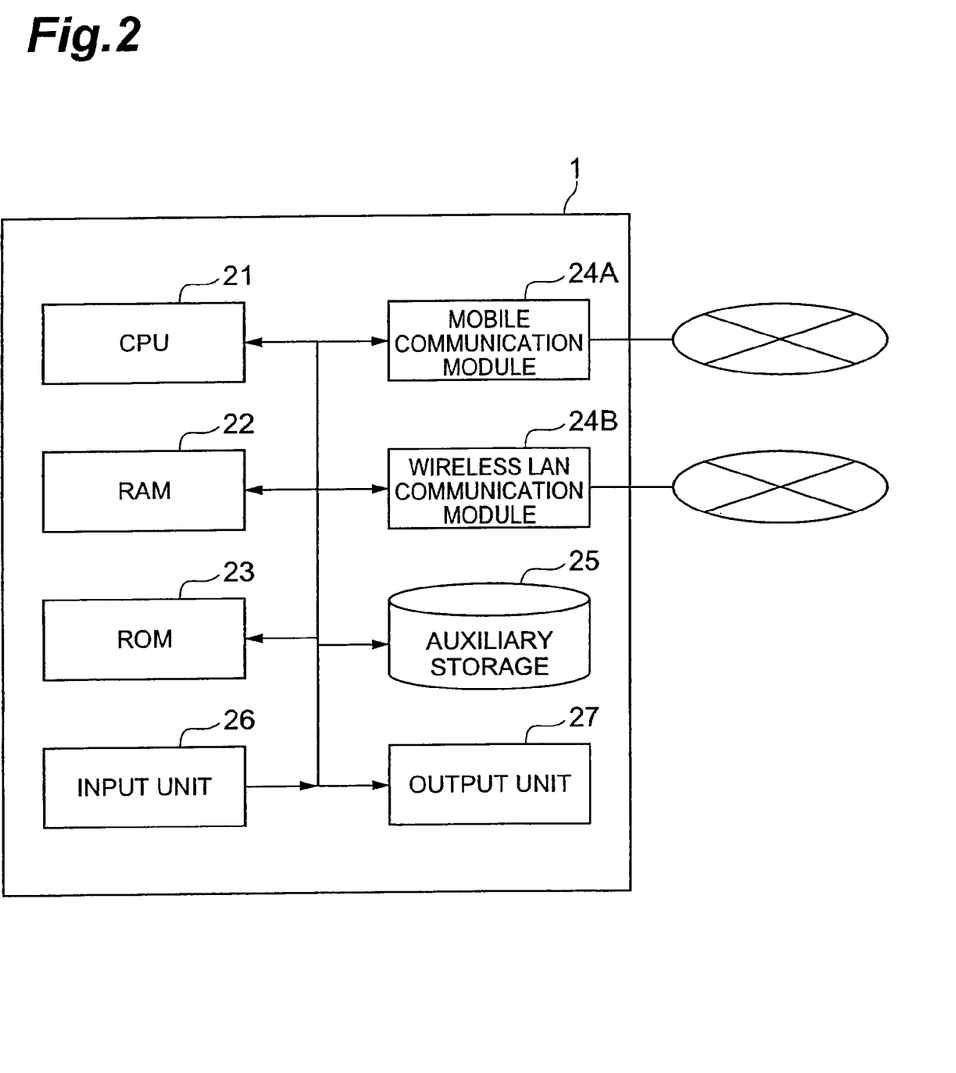
FIG. 2 is a drawing showing a hardware configuration of the cell phone shown in FIG. 1.

FIG. 2 is a hardware configuration diagram of the cell phone 1. The cell phone 1 is constructed physically as a terminal device, as shown in FIG. 2, including a CPU 21, RAM 22 and ROM 23 being main storage devices, an auxiliary storage device 25 such as a hard disk drive, an input unit 26 such as input keys or a microphone being an input device, an output unit 27 such as a speaker or a display, and communication modules 24A, 24B being data transmission/reception devices such as network cards. This communication module 24A is a module that executes data communication according to a mobile communication system, and the communication module 24B is a module that executes data communication according to a wireless LAN communication system. Each of the functions shown in FIG. 1 is implemented by loading a predetermined software application onto the hardware such as the CPU 21 and the RAM 22 shown in FIG. 2, to let the communication modules 24A, 24B, input unit 26, and output unit 27 operate under control of the CPU 21, and reading and writing data from or into the RAM 22 or the auxiliary storage device 25.

Each of the functional elements will be described below in detail with reference to FIG. 1.

The radio information collector 11 searches for radio waves receivable from the base station device 2A and the access point 2B to acquire reception powers of the radio waves, and receives broadcast information containing location information, which is broadcast from the base station device 2A and the access point 2B as sources of the radio waves. Based on the reception powers and the broadcast information, the radio information collector 11 then stores the information into the information storage unit 12, for each radio wave source, the base station device 2A or the access point 2B. The radio information collector 11 periodically executes this search for radio waves and thereby updates the information stored in the information storage unit 12, as occasion demands.

Figure 3:
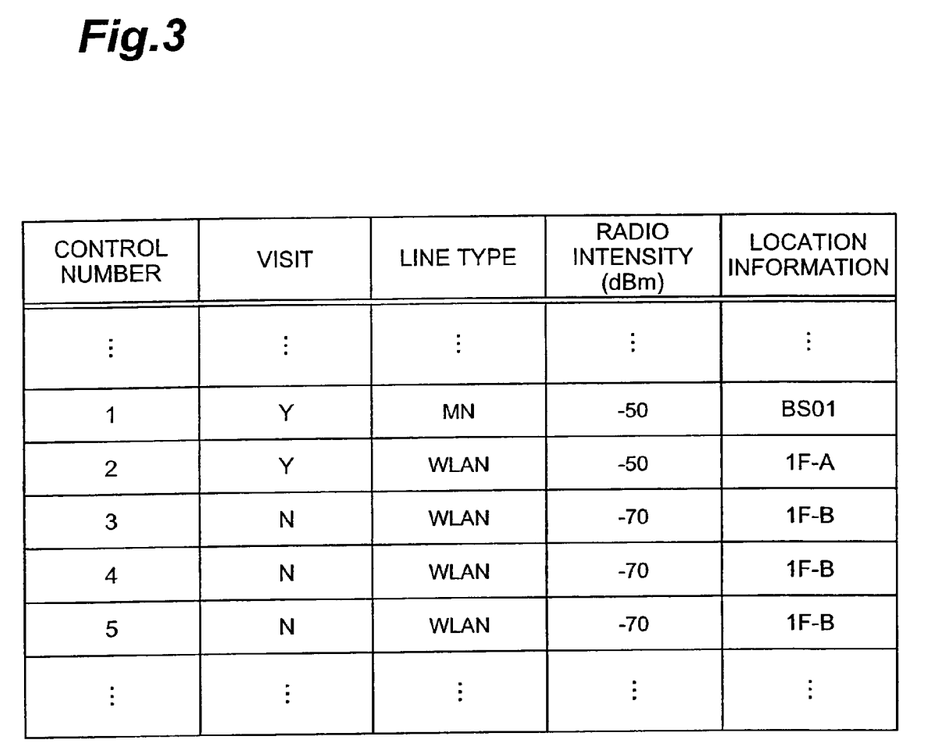
FIG. 3 is a drawing showing a configuration of data stored in an information storage unit shown in FIG. 1.

FIG. 3 is a drawing showing a configuration of data stored in the information storage unit 12 by the radio information collector 11. As shown in the same drawing, the following items are stored in correspondence to each other: "control number: 1" for identification of a base station device or an access point; "visit: Y" to indicate whether the cell phone is visiting a communication network to which the base station device or the access point belongs; "line type: MN" to indicate whether the communication network is a mobile communication network or a wireless LAN network; "radio intensity: −50 (dBm)" to indicate a reception power of a radio wave transmitted from the base station device or the access point; "location information: BS01" to specify a location of the base station device or the access point.

The radio information collector 11 makes a determination on whether the cell phone is "visiting" a mobile communication network NA, by determining whether a user authentication process (belonging process) is completed with the pertinent mobile communication network NA and whether it is able to scan a radio wave from the base station device 2A for transmitting and receiving data. It also makes a determination on whether the cell phone is "visiting" a wireless LAN network NB, by determining whether an authentication process (belonging process) is completed with the access point 2B of the pertinent wireless LAN network NB and whether it is able to perform data communication. Namely, the case of "visit: N" means that data communication is infeasible because of incompletion of the belonging process to a communication network and that if the cell phone becomes off a currently communicable area the pertinent communication network will be a target for preferential initiation of authentication. Furthermore, the radio information collector 11 determines "line type," based on a type included in a header or the like of the broadcast information transmitted from the base station device 2A and from the access point 2B, and reads "location information" out of the received broadcast information to specify the location.

Referring back to FIG. 1, the communication network selector 13 selects a communication network to be connected during browsing of the WWW server 3, out of the mobile communication network NA and the wireless LAN network NB, based on the information stored in the information storage unit 12. Specifically, it searches the information storage unit 12 for information corresponding to "visit: Y" to retrieve the radio intensity corresponding to the communication network currently visited and selected for reception of web data. If the radio intensity exceeds a predetermined threshold, the communication network selector 13 controls the data transmitter-receiver 14 so as to continue reception of web data through the currently-selected communication network. On the other hand, if the radio intensity corresponding to "visit: Y" is not more than the predetermined threshold, the communication network selector 13 retrieves from the information storage unit 12 the information corresponding to other base station devices or access points, selects a connection target out of those base station devices or access points, and controls the data transmitter-receiver 14 to initiate the belonging process with the connection target. Furthermore, the communication network selector 13 selects a communication network to which the connection target after completion of the belonging process belongs, for reception of web data. The communication network selector 13 preferentially selects a wireless LAN network NB as long as the radio intensity thereof exceeds the predetermined threshold.

The communication network selector 13 also performs the following operation: based on a data size of web data outputted from the data transmitter-receiver 14 described below, it preferentially selects a wireless LAN network NB for reception of web data if the data size is not less than a predetermined threshold. More specifically, when the data size is not less than the predetermined threshold and when the mobile communication network NA is currently selected, the communication network selector 13 refers to the information storage unit 12 to specify an access point that the cell phone is visiting or can visit, as a connection target, and performs the control to initiate the belonging process with the connection target. Then the communication network selector 13 controls the data transmitter-receiver 14 to receive the web data from the access point. In this case, if there is no available wireless LAN network NB, the communication network selector 13 continues the selection of the mobile communication network NA.

The data transmitter-receiver 14 receives web data described in HTML, cHTML, or the like and various types of download data linked thereto, via the mobile communication network NA or the wireless LAN network NB from the WWW server 3 as a website of a browsing object preliminarily designated by the user. At this time, the data transmitter-receiver 14 receives the web data via the communication network selected by the communication network selector 13 and outputs the web data to the data output controller 16.

Figure 4:
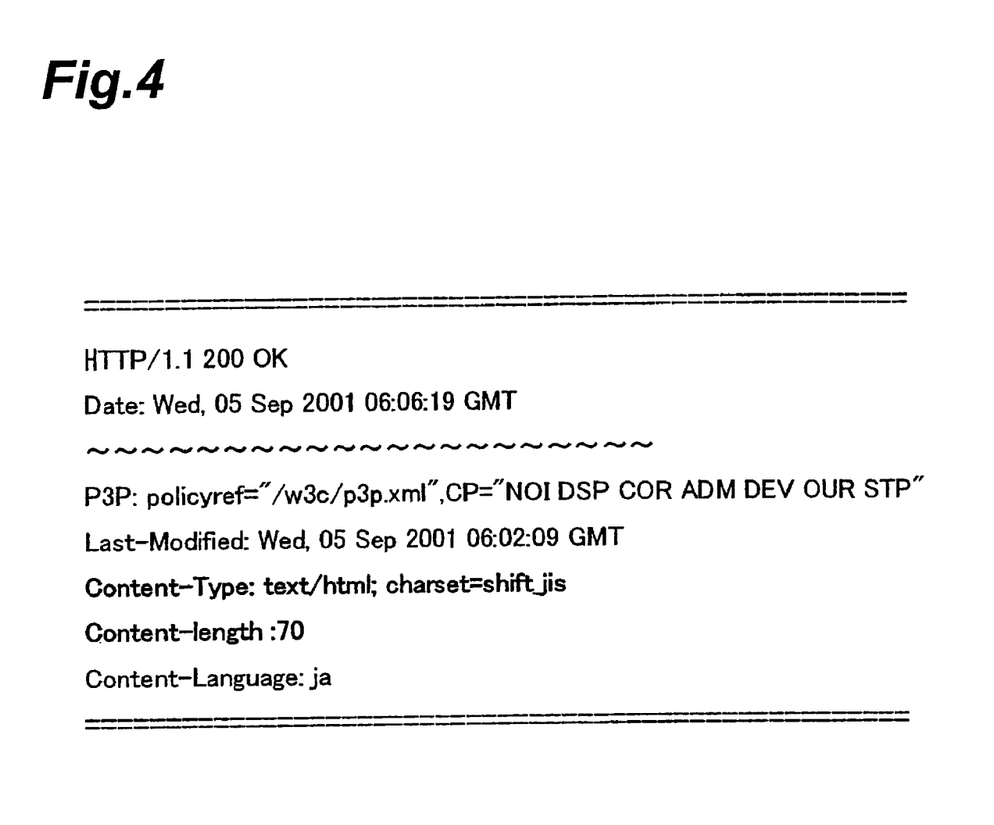
FIG. 4 is a drawing showing an example of a header part of web data received by a data transmitter-receiver shown in FIG. 1.

Prior to the reception of the main body part constituting the web data and the download data such as image data or voice data linked thereto, the data transmitter-receiver 14 receives the header part described in the head portion of the web data and outputs it to the communication network selector 13 and to the browser selector 15. FIG. 4 shows an example of the header part of web data received by the data transmitter-receiver 14. As shown in the same drawing, the data transmitter-receiver 14 receives the header part including "HTTP/1.1~" information to specify the description language (data format) of the web data, "Content-Length: 70" information to indicate the data size of the web data, and "Content-Type: text/html" information to indicate the data type of the web data. This data type indicates a type of download data such as a voice file, a text file, or an image file downloaded as web data, and it can also be specified from the identification information of download data included in the main body part of web data and be outputted to the communication network selector 13.

Referring back to FIG. 1, the browser selector 15 determines which is the description language of web data, "cHTML" or "HTML," based on the information to specify the description language outputted from the data transmitter-receiver 14, and selects and activates a browser means to be used for browsing the web data, out of the first browser 17 and the second browser 18 in accordance with the result of the determination. Namely, the browser selector 15 selects the first browser 17 when the description language is "cHTML"; it selects the second browser 18 when the description language is "HTML."

The data output controller 16 outputs the web data outputted from the data transmitter-receiver 14, to the browser means selected out of the first browser 17 and the second browser 18 by the browser selector 15, thereby outputting the target web data in a browsable state to the output unit 27 (cf. FIG. 2).

Figure 5:
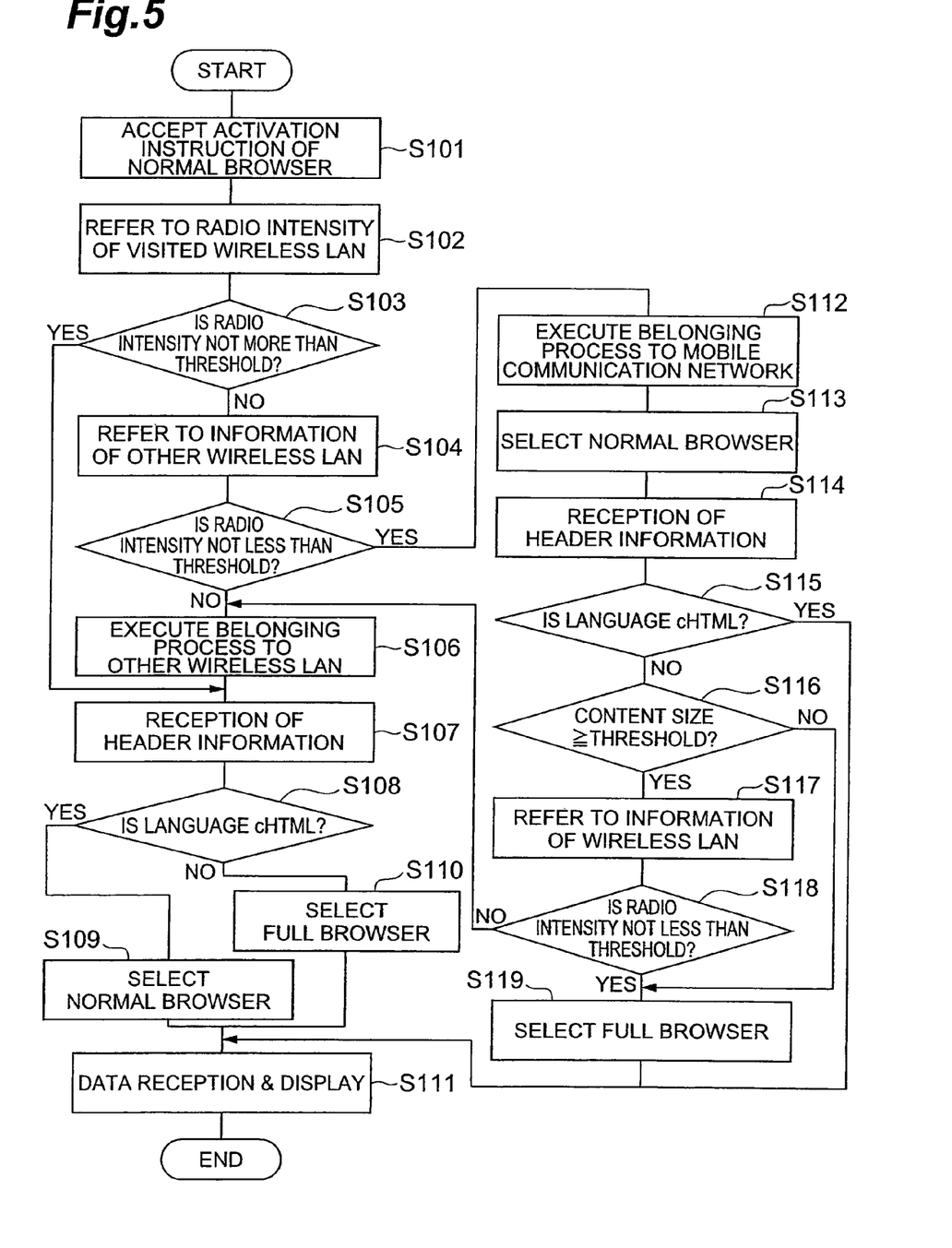
FIG. 5 is a flowchart showing an operation in selection of a normal browser in the cell phone shown in FIG. 1.

Operations of the cell phone 1 will be described below with reference to FIGS. 5 and 6, while a website browsing method in the cell phone 1 will also be described in detail. FIG. 5 is a flowchart showing an operation of the cell phone 1 in activation of the normal browser and FIG. 6 a flowchart showing an operation of the cell phone 1 in activation of the full browser.

First, as shown in FIG. 5, an activation instruction of the normal browser is accepted from the user of the cell phone 1 in a state in which the cell phone is visiting the access point 2B of the wireless LAN network NB, and thereafter a URL of the WWW server 3 is accepted as a communication site during the browsing process (step S101). Next, the communication network selector 13 retrieves a data record in which the line type is the wireless LAN network "WLAN" and the visit is "Y," from the information storage unit 12 and refers to the radio intensity about the access point 2B (step S102). Then the communication network selector 13 determines whether the radio intensity of the access point 2B is not more than the predetermined threshold (step S103). When it is determined that the radio intensity is not more than the threshold (step S103; NO), the communication network selector 13 retrieves a data record in which the line type is the wireless LAN network "WLAN" and the visit is "N," and refers to the information about an available access point except for the access point 2B (step S104). Thereafter, it is determined whether the radio intensity of the available access point is not less than the predetermined threshold (step S105). When it is determined that the radio intensity is not less than the threshold (step S105; NO), the communication network selector 13 executes the belonging process to the pertinent access point to change the visited access point, and then the processing is transferred to step S107 (step S106).

On the other hand, when the radio intensity of the access point 2B exceeds the threshold (step S103; YES), the following processing is carried out while the cell phone belongs to the access point 2B. Namely, the data transmitter-receiver 14 receives the header part of web data as a browsing object from the WWW server 3 (step S107). Then the browser selector 15 determines the description language of the web data from the information included in the header part (step S108). When it is determined that the description language is "cHTML" (step S108; YES), the first browser 17 is selected as a means for browsing the web data (step S109). On the other hand, when the description language is "HTML" (step S108; NO), the second browser 18 is selected as a means for browsing the web data (step S110). Thereafter, the data transmitter-receiver 14 receives the web data from the WWW server 3 via the base station device 2A or the access point 2B selected by the communication network selector 13, and the data output controller 16 outputs the web data to the browser selected by the browser selector 15, to be displayed (step S11).

When it is determined in step S105 that the radio intensity of every available access point is less than the predetermined threshold (step S105; YES), the communication network selector 13 retrieves a data record in which the line type is the mobile communication network "MN," from the information storage unit 12, refers to the information about an available base station device 2A except for the access point 2B, and executes the belonging process to the base station device 2A (step S112). Then the browser selector 15 selects the first browser 17 as a browser means for browsing the web data (step S113). Thereafter, the browser selector 15 refers to the information included in the header part from the WWW server 3 (step S114) and determines the description language of the web data (step S115). When it is determined that the description language is "cHTML" (step S115; YES), the processing is transferred to step S111 to browse the web data by the first browser 17 via the mobile communication network NA.

On the other hand, when it is determined in step S15 that the description language is "HTML" (step S115; NO), the communication network selector 13 determines whether the data size included in the header part is not less than the predetermined threshold (step S116). When it is determined that the data size is less than the threshold (step S116; NO), the browser selector 15 selects the second browser 18 as a browser means for browsing the web data (step S119). Thereafter, the processing is transferred to step S111 to browse the web data by the second browser 18 via the mobile communication network NA.

When it is determined in step S116 that the data size is not less than the threshold (step S116; YES), the communication network selector 13 retrieves a data record in which the line type is the wireless LAN network "WLAN," from the information storage unit 12, refers to the information about an available access point (step S117), and executes the comparison process with the threshold for the radio intensity about the access point (step S118). When it is determined that there is no access point with the radio intensity not less than the threshold (step S118; YES), the processing is transferred to step S119 to browse the web data by the second browser 18 via the mobile communication network NA. On the other hand, when there is an access point with the radio intensity not less than the threshold (step S118; NO), the processing is transferred to step S106 to execute the belonging process to the access point.

Figure 6:
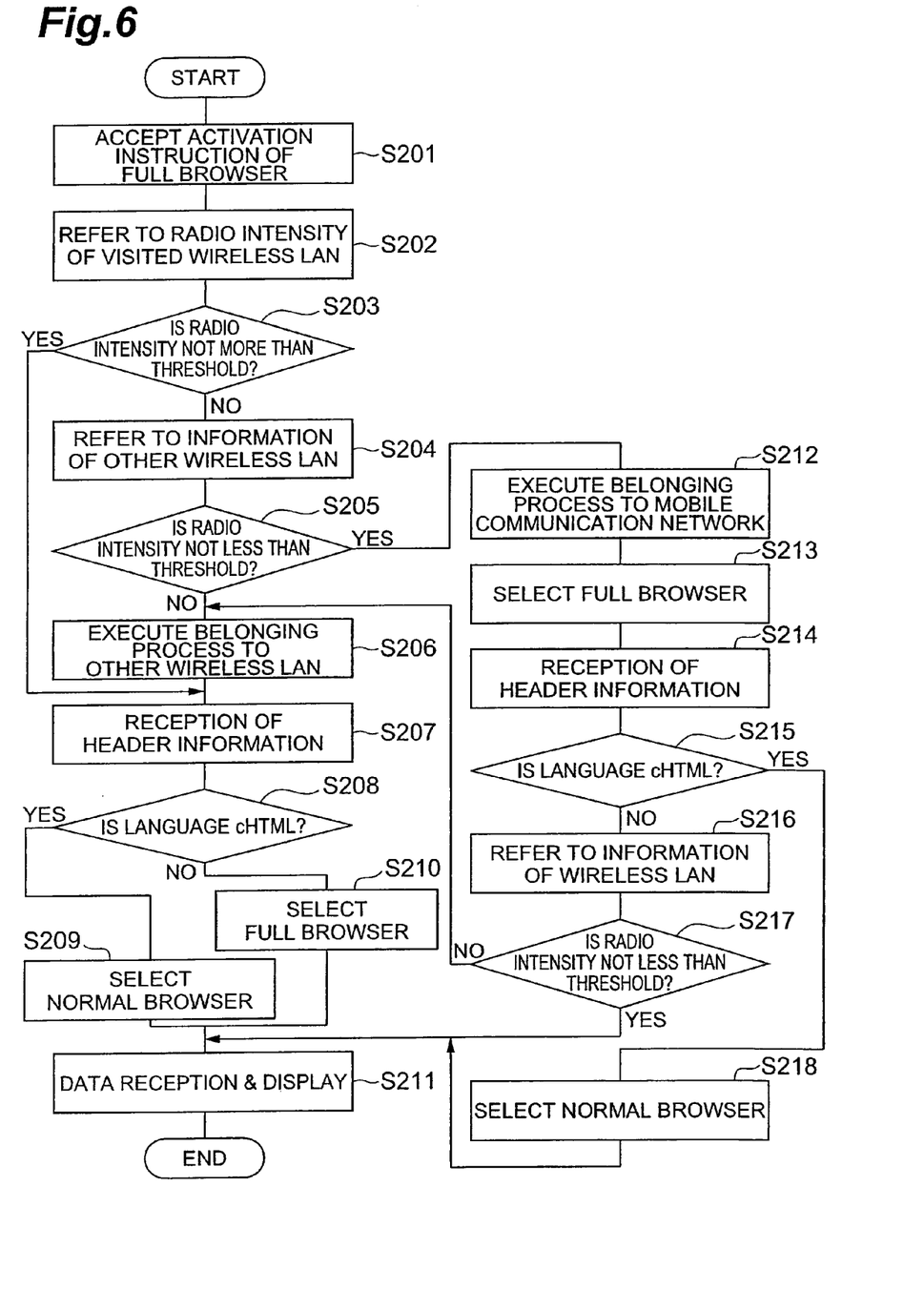
FIG. 6 is a flowchart showing an operation in selection of a full browser in the cell phone shown in FIG. 1.

Next, FIG. 6 shows an operation in a situation in which the cell phone 1 accepts a user's activation instruction of the full browser in a state in which it is visiting the access point 2B of the wireless LAN network NB. The operation in steps S202-S211 shown in FIG. 6 is the same as the operation in steps S102-S111 shown in FIG. 5, and the detailed description thereof is omitted herein.

First, the activation instruction of the full browser is accepted from the user of the cell phone 1 and thereafter the URL of the WWW server 3 is accepted as a communication site during the browsing process (step S201). Thereafter, an intervening access point and a type of browser means are selected according to the radio intensity about the available access point and the description language of web data received (steps S202-211).

When it is determined in step S205 that there is no available access point, the belonging process to the mobile communication network NA is executed (step S212). Then the browser selector 15 selects the second browser 18 as a browser means for browsing the web data (step S213). Thereafter, the browser selector 15 refers to the information included in the header part from the WWW server 3 (step S214) to determine the description language of the web data (step S215). When it is determined that the description language is "cHTML" (step S215; YES), the first browser 17 is selected as a browser means (step S218). Thereafter, the processing is transferred to step S211 to browse the web data by the first browser 17 via the mobile communication network NA.

On the other hand, when the description language is "HTML" (step S215; NO), the communication network selector 13 retrieves a data record in which the line type is the wireless LAN network "WLAN," from the information storage unit 12, refers to the information about an available access point (step S216), and executes the comparison process with the threshold for the radio intensity about the access point (step S217). When it is determined that there is no access point with the radio intensity not less than the threshold (step S217; YES), the processing is transferred to step S211 to browse the web data by the second browser 18 via the mobile communication network NA. On the other hand, when there is an access point with the radio intensity not less than the threshold (step S217; NO) the processing is transferred to step S206 to execute the belonging process to the access point.

The cell phone 1 described above is arranged to acquire the radio intensity information about the mobile communication network NA and the wireless LAN network NB from the base station device 2A and the access point 2B, to select a communication network as a connection target, based on the radio intensity information, and arranged to receive the information about the description language of web data from the WWW server 3 as a browsing object and to select a browsing means capable of browsing the web data of the description language, out of the first browser 17 and the second browser 18. In this configuration, the optimal combination of the browsing means with the communication network is automatically selected according to the current network environment and the type of the website as a browsing object, which improves the user's convenience during browsing the website.

Since the cell phone is arranged to select a communication network suitable for the data size of the web data as a browsing object, smooth browsing of the website is implemented while minimizing the load on the communication network.

It is noted that the present invention is by no means limited to the above-described embodiments. For example, the communication network selector 13 may execute the process of selecting the communication network, based on the information indicating the data type of download data like "Content-type" included in the header part, instead of or in addition to the process of selecting the communication network, based on the information about the data size included in the header part of web data. In this case, it also becomes feasible to select the communication network, for example, in reception of large-volume data such as image data or voice data, in accordance therewith, whereby smooth browsing of the website is implemented while minimizing the load on the communication network.

What is claimed is:

1. A mobile communication terminal for browsing web data from a predesignated communication site through a communication network selected out of a mobile communication network and a wireless LAN network, the mobile communication terminal comprising:

first browsing means for browsing web data described in a first data format;

second browsing means for browsing web data described in a second data format;

radio information collecting means for receiving radio waves from a base station device belonging to the mobile communication network and from an access point device belonging to the wireless LAN network, and thereby acquiring radio intensity information about the mobile communication network and the wireless LAN network;

communication network selecting means for selecting a communication network to be connected, out of the mobile communication network and the wireless LAN network, based on the radio intensity information acquired by the radio information collecting means;

data information receiving means for receiving information about a data format of web data as a browsing object from the communication site;

browser selecting means for determining which of the first and second data formats is the data format received by the data information receiving means, and thereby selecting either of the first browsing means and the second browsing means; and data outputting means for receiving the web data from the communication site via the communication network selected by the communication network selecting means and for outputting the web data to the browsing means selected by the browser selecting means.

2. The mobile communication terminal according to claim 1, wherein the data information receiving means further receives information about a data size of the web data, and
wherein, based on the information about the data size, the communication network selecting means selects the wireless LAN network if the data size is not less than a predetermined threshold, and the communication network selecting means selects the mobile communication network if the data size is less than the predetermined threshold.

3. The mobile communication terminal according to claim 1, wherein the data information receiving means further receives information about a data type of the web data, and
wherein, based on the information about the data type, the communication network selecting means further selects the communication network out of the mobile communication network and the wireless LAN network.

4. A website browsing method for browsing web data from a predesignated communication site through a communication network selected out of a mobile communication network and a wireless LAN network, the website browsing method comprising:

a first browsing step wherein first browsing means browses web data described in a first data format;

a second browsing step wherein second browsing means browses web data described in a second data format;

a radio information collecting step wherein radio information collecting means receives radio waves from a base station device belonging to the mobile communication network and from an access point device belonging to the wireless LAN network, and thereby acquires radio intensity information about the mobile communication network and the wireless LAN network;

a communication network selecting step wherein communication network selecting means selects a communication network to be connected, out of the mobile communication network and the wireless LAN network, based on the radio intensity information acquired in the radio information collecting step;

a data information receiving step wherein data information receiving means receives information about a data format of web data as a browsing object from the communication site;

a browser selecting step wherein browser selecting means determines which of the first and second data formats is the data format received in the data information receiving step, and thereby selects either of the first browsing means and the second browsing means; and a data outputting step wherein data outputting means receives the web data from the communication site through the communication network selected in the communication network selecting step and outputs the web data to the browsing means selected in the browser selecting step.

* * * * *